US010488202B1

(12) United States Patent
Tannenbaum et al.

(10) Patent No.: US 10,488,202 B1
(45) Date of Patent: Nov. 26, 2019

(54) SYSTEM AND METHOD OF USE FOR SELF-CONTAINED VEHICULAR NAVIGATION SYSTEM

(71) Applicants: Adam Benjamin Tannenbaum, Ashdod (IL); Robert Brownstein, Santa Cruz, CA (US)

(72) Inventors: Adam Benjamin Tannenbaum, Ashdod (IL); Robert Brownstein, Santa Cruz, CA (US)

( * ) Notice: Subject to any disclaimer, the term of this patent is extended or adjusted under 35 U.S.C. 154(b) by 0 days.

(21) Appl. No.: 16/242,505

(22) Filed: Jan. 8, 2019

(51) Int. Cl.
*G01C 21/16* (2006.01)
*G01C 21/36* (2006.01)
*G01S 19/49* (2010.01)
*G01C 21/14* (2006.01)

(52) U.S. Cl.
CPC .......... *G01C 21/165* (2013.01); *G01C 21/14* (2013.01); *G01C 21/3676* (2013.01); *G01S 19/49* (2013.01)

(58) Field of Classification Search
CPC .. G01C 21/165; G01C 21/14; G01C 21/3676; G01S 19/49

USPC .......................................................... 701/410
See application file for complete search history.

(56) References Cited

U.S. PATENT DOCUMENTS

| | | | |
|---|---|---|---|
| 4,774,671 A | 9/1988 | Itoh et al. | |
| 4,879,658 A | 11/1989 | Takashima et al. | |
| 5,031,104 A | 7/1991 | Ikeda et al. | |
| 5,159,556 A | 10/1992 | Schorter | |
| 5,311,434 A | 5/1994 | Tamai | |
| 5,652,706 A | 7/1997 | Morimoto et al. | |
| 5,862,511 A | 1/1999 | Croyle et al. | |
| 6,577,334 B1 * | 6/2003 | Kawai | B60G 17/0165 348/148 |
| 7,317,987 B2 | 1/2008 | Nahla | |
| 2011/0301839 A1 * | 12/2011 | Pudar | H04W 4/04 701/408 |

* cited by examiner

*Primary Examiner* — Gertrude Arthur Jeanglaude
(74) *Attorney, Agent, or Firm* — Robert Brownstein

(57) ABSTRACT

The invention disclosed comprises a system and use method for a vehicular navigation system that does not rely on continuous or frequent GPS satellite signal reception. The invention has self-contained subsystems that provide vehicle speed, compass direction and based on elapsed time, vehicle location.

2 Claims, 8 Drawing Sheets

SYSTEM AND METHOD OF USE FOR SELF-CONTAINED VEHICULAR NAVIGATION SYSTEM

TECHNICAL FIELD

The present invention relates to navigation systems for use in vehicles

BACKGROUND OF THE INVENTION

It is common in many vehicles, as standard equipment or optional equipment, to include a vehicular navigation system. These systems determine the present location of a vehicle and based on destination information provided by a user—usually street number, name, city and state—these systems plot out a route and track the vehicle's progress along that route as the vehicle is being driven.

Virtually all such vehicular navigation systems rely on the signals received from Global Positioning System (GPS) satellites to determine initial vehicle location and to provide speed and direction derived from successive location readings to enable the vehicular navigation system to track the vehicle.

Clearly, such systems therefore rely on continuous or frequent GPS location information which, in turn, requires continuous or frequent reception of GPS satellite signals during the journey.

GPS satellites provide adequately accurate positioning information to support navigation plotting and tracking. However, under some circumstances, these signals may be blocked or impaired. For example, in urban areas, such as New York City, where streets may be bordered on both sides by very tall buildings, the satellite signals may be blocked. In areas where the vehicle is traveling on roads bordered by dense tree foliage, the signals may be impaired. For systems that rely on continuous or frequent GPS signal reception, this can cause disruption and inaccurate tracking.

BRIEF SUMMARY OF THE INVENTION

The invention herein disclosed and claimed uses the prior art of contemporary vehicular navigation systems and adds subsystems and functions that can eliminate reliance upon continuous or frequent GPS signal reception.

With this invention, GPS signals may play an initializing role in the invention's operation but continuous or frequent GPS signal reception is not relied upon. Instead, other self-contained subsystems and functions provide the necessary vehicle speed and direction information with which the vehicular navigation system is able to track the vehicle's progress along a prescribed route.

In some cases, the GPS signals may be dispensed with entirely; in other cases they are used initially for vehicle location and calibration of other subsystems that provide speed and direction information. Once the initial location is established, and shortly after the vehicle begins traveling, the navigation system no longer requires GPS signals for tracking. In fact, even if a journey is interrupted and the vehicle is powered down and parked, overnight, the system stores the location and vehicle heading direction information just before power down and then restores it upon subsequent power up. Thus, even for a journey that may take several days, the GPS signals, at most, are needed at the outset of the journey and no longer required from then on.

BRIEF DESCRIPTIONS OF THE DRAWINGS

DETAILED DESCRIPTION OF INVENTION

Figure 1:
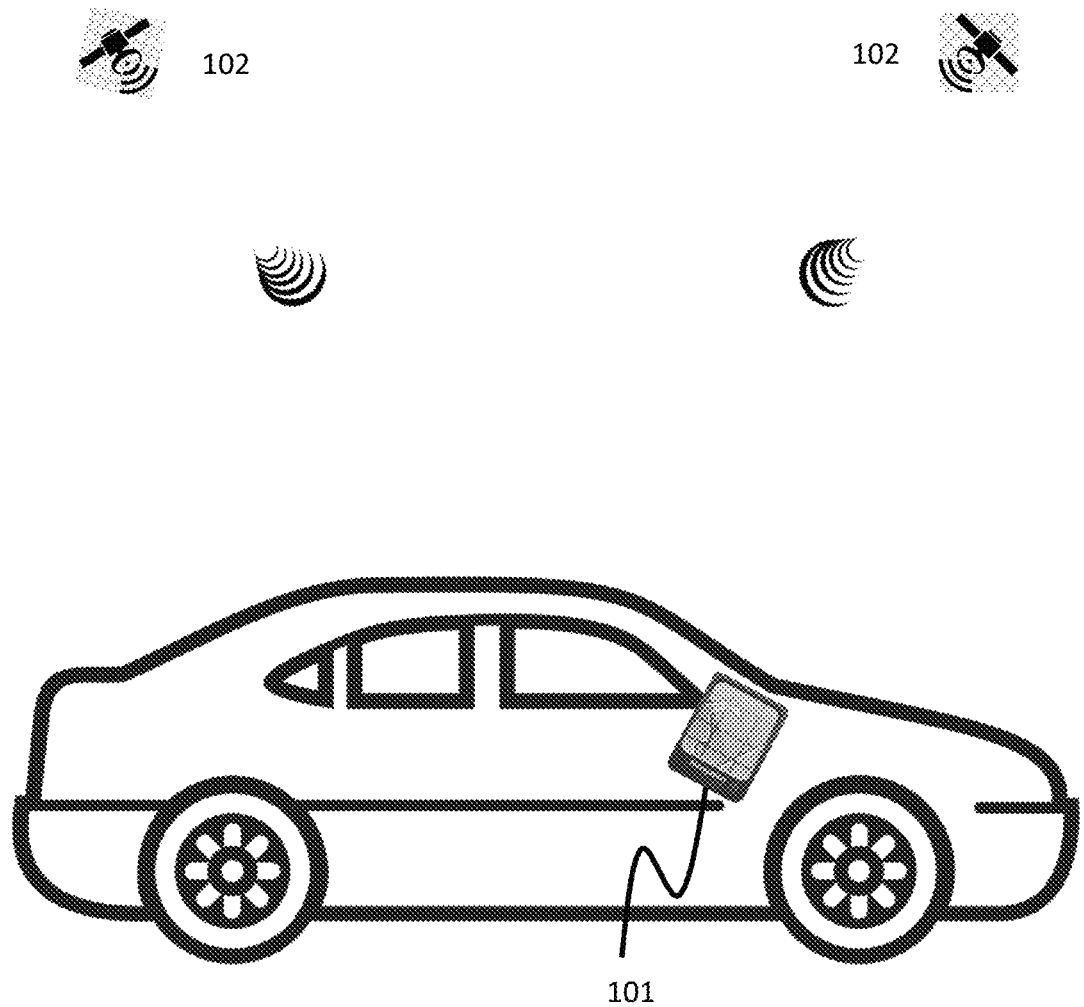
FIG. 1 shows a typical vehicular navigation system which relies upon continuous or frequent GPS signal reception. This is prior art.

Contemporary vehicular navigation systems use continuous or frequent satellite position data to establish a vehicle's initial position and to track its progress along a prescribed route. Vehicle speed and direction are derived based on sequential vehicle position data as derived from the reception of GPS satellite signals. Thus, these navigation systems rely on continuous or frequent satellite positioning-system signals.

Under certain conditions, satellite signals may be blocked by rows of tall buildings and dense foliage. In such cases, navigation systems may try to interpolate vehicle position based on last received signal and routing data. The longer the interruption, the greater the likelihood of increasing positional error.

The invention herein disclosed and claimed is essentially self-contained in that it does not rely on external satellite signals to be received continuously or frequently. Instead, once an initial vehicle position is established, the system uses built-in sensor subsystems to provide vehicle speed and direction information. Using that information and elapsed time, the system is able to provide tracking of a vehicle's progress along a prescribed route.

Contemporary vehicular navigation systems use mapping data along with a vehicle's initial position coordinates and destination coordinates to plot a route from initial position to destination position. That is prior art. A vehicle's initial position is derived from GPS satellite signals received by the vehicular navigation system. A vehicle's destination position is derived from street number, street name, city and state information provided by a user. This is prior art.

Once a prescribed route has been plotted and accepted by a user, the vehicle's travel progress along that route is determined by continuous or frequent GPS satellite signals received and processed by the navigation system. Using prior-art programmatic algorithms, one can derive vehicle speed and direction from such data.

Reliance upon continuous or frequent GPS satellite signal reception represents system vulnerability. Driving in cities full of skyscraper-height buildings may block one or more signals from being received. Driving in areas where roads are bordered by tall, dense foliage may block or impede one or more signals. Since these contemporary systems rely on continuous or frequent reception of GPS signals, anything that interrupts that reception may interrupt navigation functions. Where an interruption persists some systems will convey a message to a user stating the system is attempting to re-establish GPS reception. While doing so, the system may no longer provide tracking information which could result in missing one or more navigation directives, such as being told to turn right at an intersection which the vehicle has already passed through.

Many vehicles have magnetic sensing subsystem able to detect and display the compass direction in which a vehicle is headed. Virtually all vehicles have speedometers which detect and display vehicular speed. Many speedometers use the relationship between wheel rotation and distance traveled to derive vehicle speed. That said, contemporary vehicular navigation systems do not ordinarily interface with those magnetic sensors or wheel-rotation sensors.

Magnetic sensors are reasonably accurate but may give distorted readings in the presence of large external magnetic fields. Wheel-rotation sensors accurately detect wheel rotation but actual travel distance is a function of tire diameter. For example, if a tire's diameter is 24 inches and the wheel rotation is 10 rotations per second, the vehicle will move about 62 feet in one second. In miles per hour, that is approximately 43. However, if tire wear reduces the circumference, the speed will actually be less, or if a user replaces a wheel and tire with a tire having a larger diameter, the speed will actually be higher. A speedometer or wheel-rotation sensor, though, in both cases will not show a different reading.

To ensure that wheel-rotation relationship to speed and magnetic sensor relationship to direction are as accurate as that of a GPS, if both readings are calibrated against a GPS signal for a brief amount of time, the error can be mitigated. As a result, from that point on, the wheel-rotation sensor and magnetic sensor can provide continuous data to a navigation system and obviate the need for GPS signal receptors henceforth on that journey.

If the system is operative to store the current location information and vehicle direction heading any time the vehicle is stopped, parked, and turned off, that information can be restored upon power up and there would be no need for further GPS reception. Thus, even a plotted route that entailed several days of driving could continue to use the navigation system without GPS reception after the initial location and speed/direction calibration was completed. That process could be done in a few minutes at the outset of a trip. The calibration information could be stored and reused and infrequently recalibrated using GPS without relying on continuous or frequent GPS reception. Using map data and user location selection the initial vehicle position may be provided without GPS signal reception. This invention with the wheel-rotation sensor and magnetic sensor inputs could provide uninterrupted navigation in cities with skyscrapers and along roads with tall trees on either side. As such it represents an improvement over prior-art vehicular navigation systems.

To reiterate, and using drawings for greater detail, contemporary vehicular navigation systems, such as that shown in FIG. 1 (101) rely upon continuous or frequent reception of positioning system satellite signals (102). This s prior art.

Figure 2:
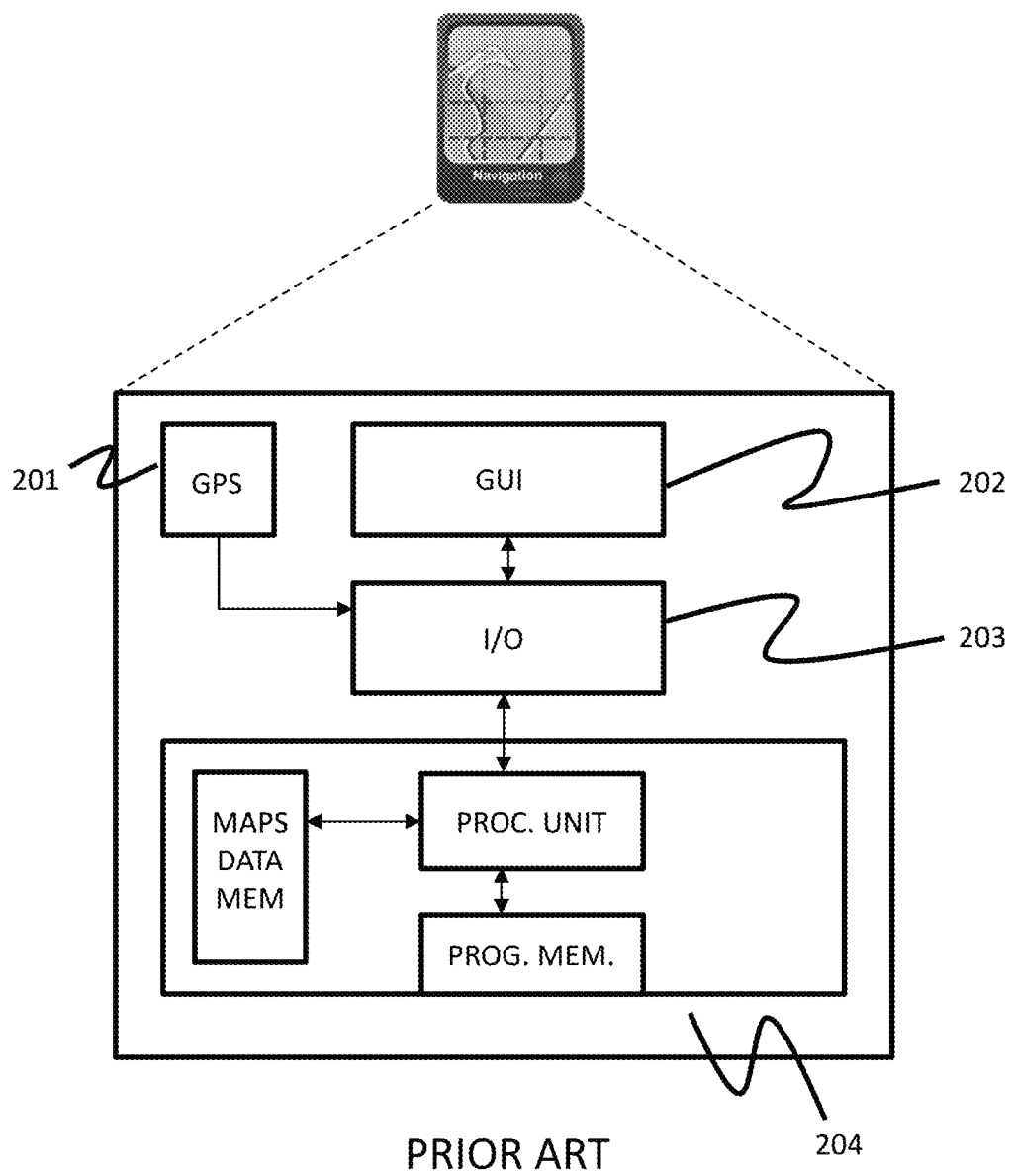
FIG. 2 shows an exemplary navigation system and subsystems of which it is comprised. This is prior art.

In FIG. 2, an exemplary navigation system and its subsystems are shown. It comprises a GPS receiver (201), a graphical user interface (GUI) subsystem (202), an input/output (I/O) subsystem (203) and navigation engine (204) which comprises a processing unit, program memory and maps data memory. The program or programs are operative to get initial location input from the GPS via I/O, and destination information from a user via the GUI and I/O, and plot a route. Once the vehicle begins driving that route, the system uses sequential GPS signal data to track vehicle location, speed and direction. This is prior art.

Figure 3:
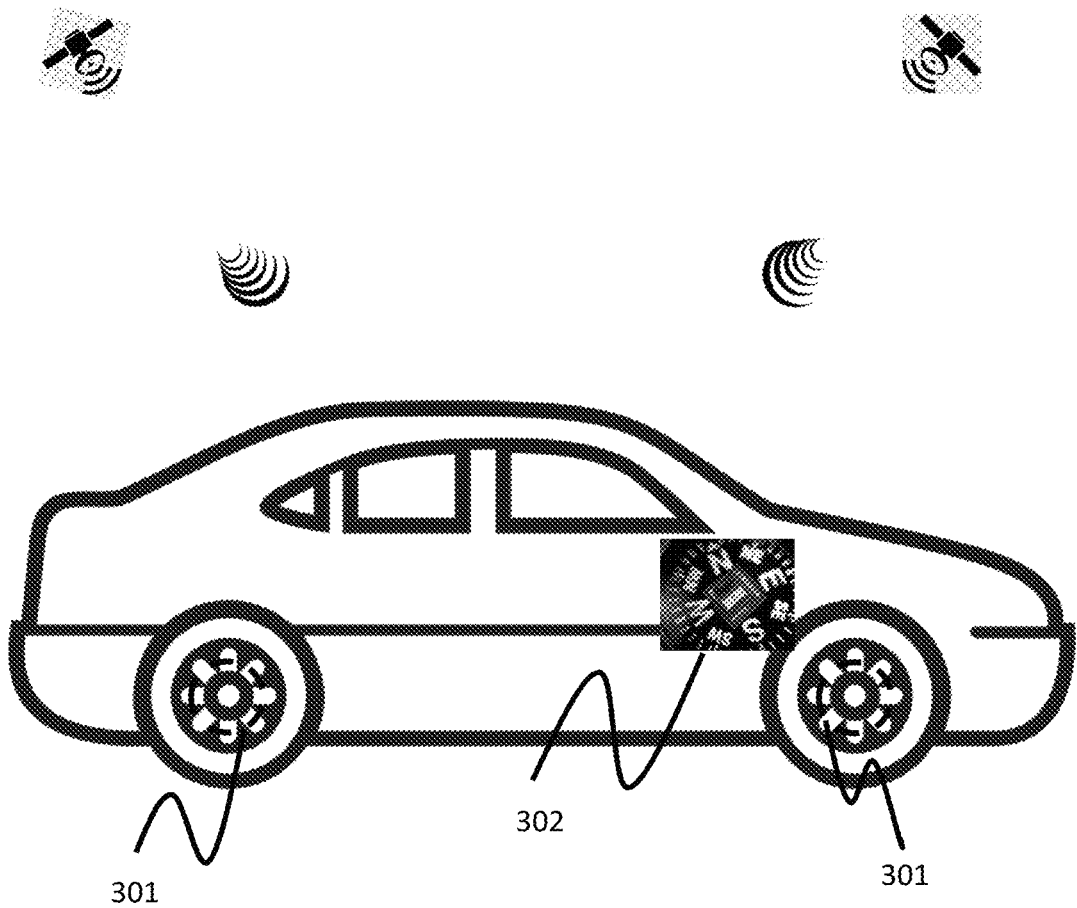
FIG. 3 depicts an embodiment of the invention where in addition to the prior art system of FIGS. 1 and 2, new subsystems are shown for deriving speed and direction.

In FIG. 3, a vehicle is outfitted with wheel-rotation sensors (301) operative to detect and convey wheel rotation data. It is also outfitted with a magnetic sensor operative to detect and convey vehicle compass direction heading.

Figure 4:
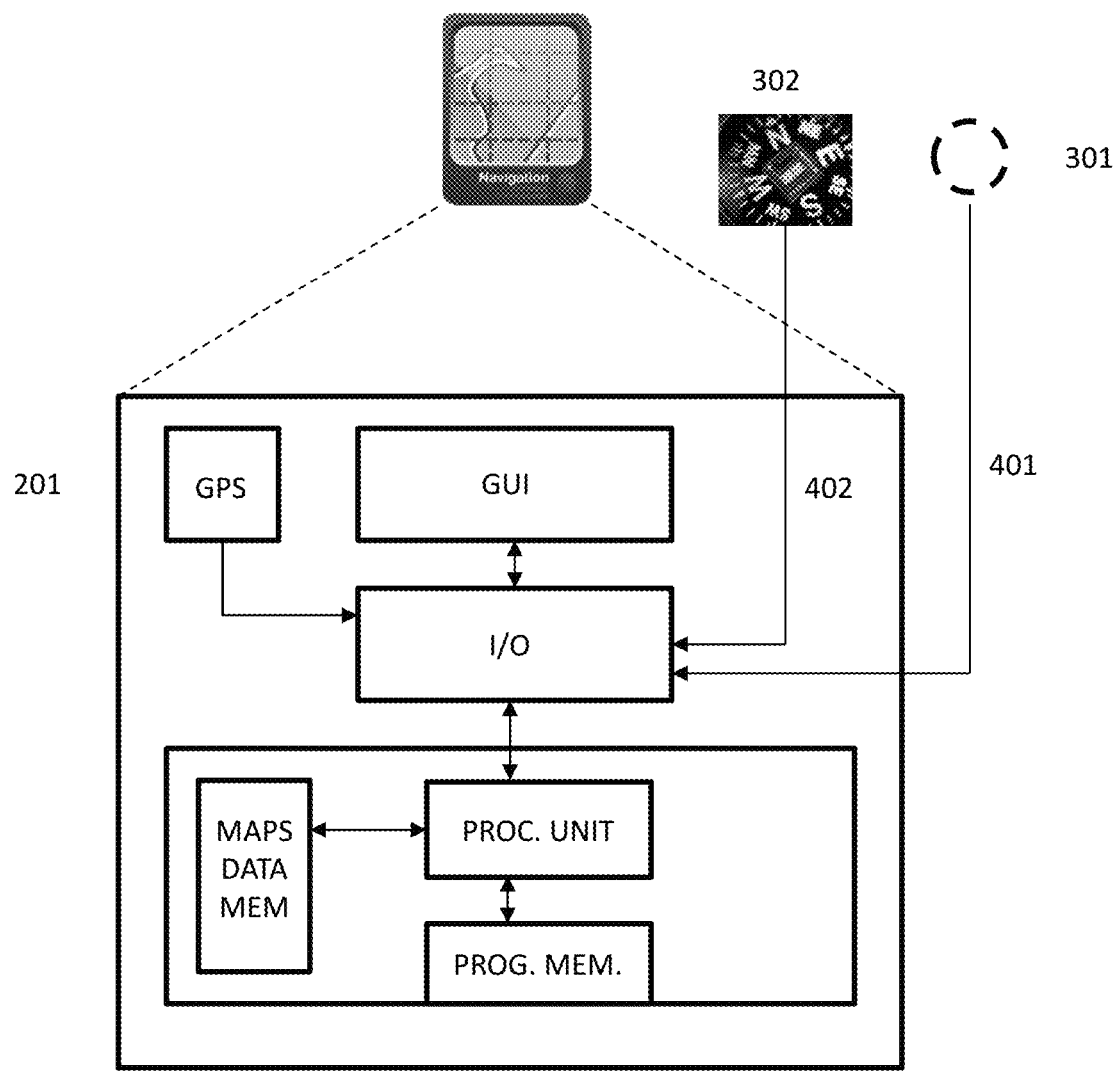
FIG. 4 shows an exemplary embodiment of the invention system incorporating the newly added subsystems of FIG. 3 and showing a conductive data path from subsystems to navigation engine.

In FIG. 4, an embodiment of the invention is shown wherein the wheel rotation subsystem (301) and magnetic sensor subsystem (302) of FIG. 3 conveys data conductively over paths 401 and 402, respectively, to the I/O subsystem of the navigation system (201).

Figure 5:
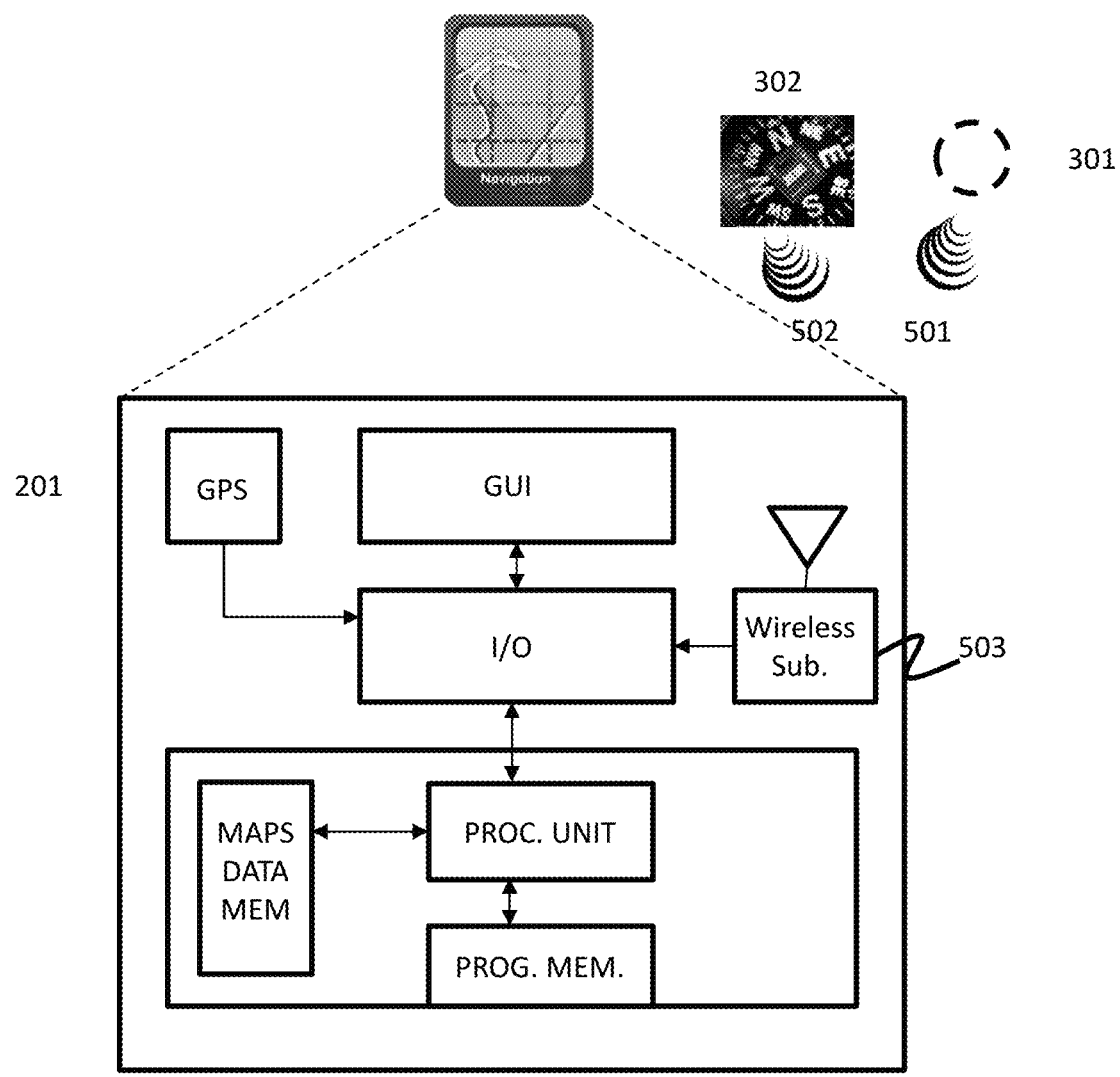
FIG. 5 shows an exemplary embodiment of the invention showing a newly added subsystem and wireless conveyance of data from speed and direction subsystems to the navigation engine.

In FIG. 5, a different embodiment of the invention is shown wherein the navigation system (201) has a wireless subsystem (503); and the wheel-rotation sensor (301) and magnetic sensor (302) convey data to the I/O subsystem wirelessly (501 and 502) via wireless subsystem (503).

Figure 6:
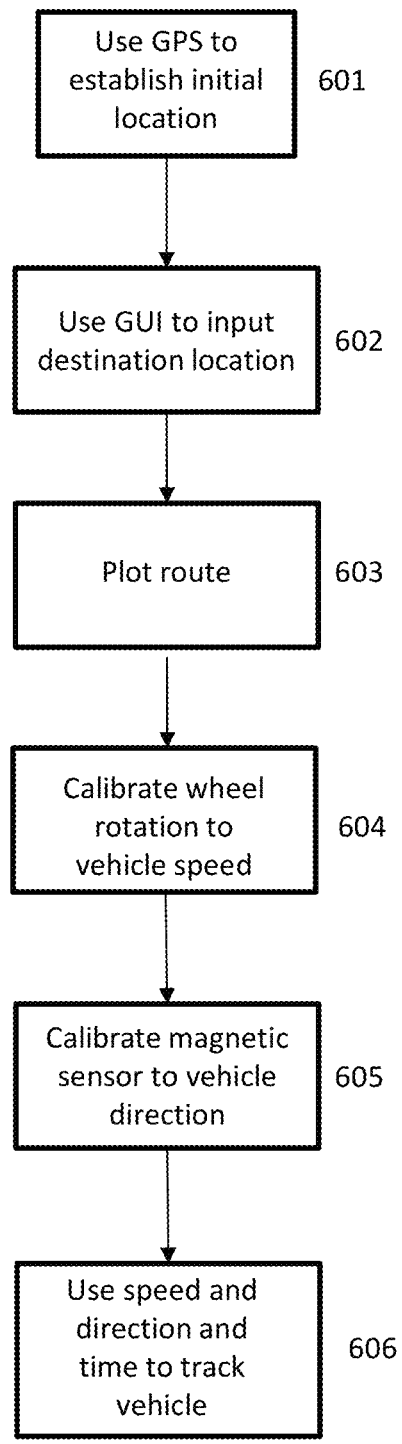
FIG. 6 is an exemplary use method flow.

Some use cases may help to further elucidate how the invention operates and how it is distinct from prior art. As shown in FIG. 6, one use method embodiment, GPS signals are used to establish a vehicle's initial location (601). The GUI is used by a user to input destination location (602). The navigation system then plots a route linking the initial location and destination location (603). Using GPS signals once the vehicle is in motion, wheel-rotation sensor is calibrated to GPS derived vehicle speed (604). Similarly, magnetic sensor is calibrated using GPS derived direction heading (605). From that point, on, speed as conveyed by calibrated wheel-rotation sensor and direction as conveyed by calibrated magnetic sensor plus elapsed time are used to provide tracking location, speed and direction in lieu of GPS satellite signals and their location, speed and direction derivations.

Figure 7:
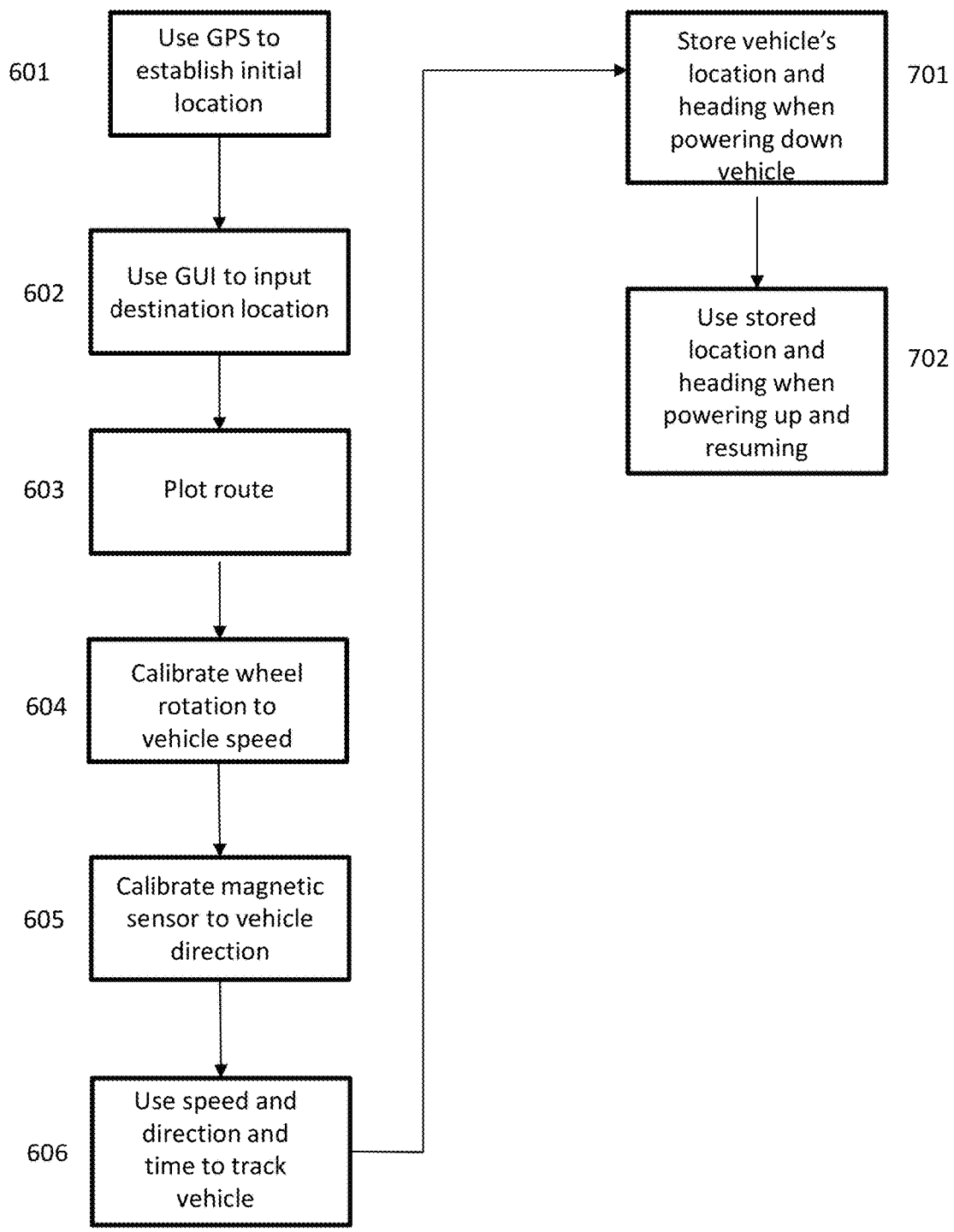
FIG. 7 is a second exemplary use method flow.

FIG. 7 is a second use method embodiment that combines the information for FIG. 6 with two added flow items: storing the vehicle's current location and direction heading when powering down the vehicle (701) and using that stored location and direction heading when subsequently powering up the vehicle and resuming the journey (702).

Figure 8:
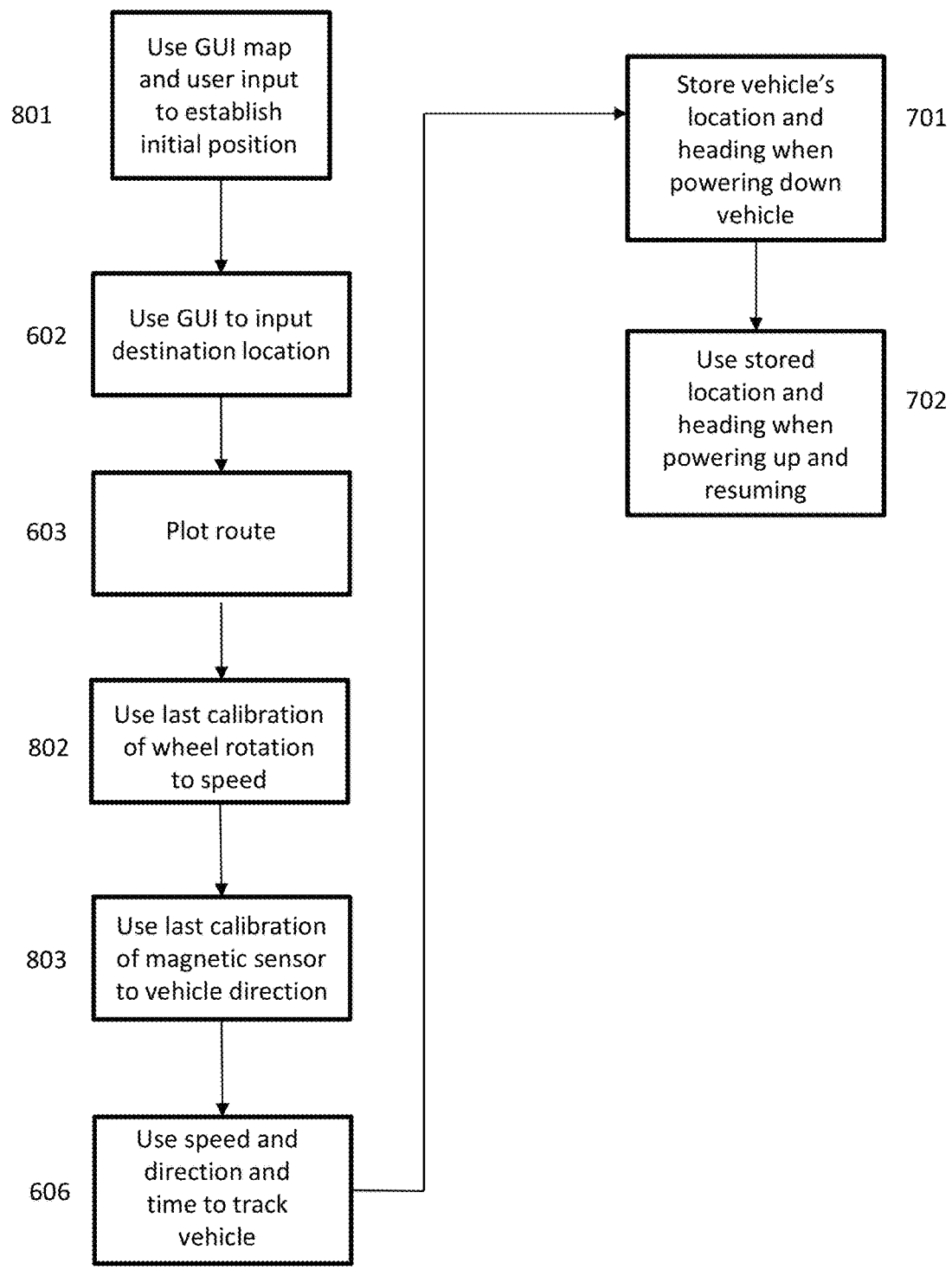
FIG. 8 is a third exemplary use method flow.

FIG. 8 is a third use method embodiment wherein there is no need for GPS signals. Here, the initial vehicle location is established using map data and user GUI input (801). As in FIG. 7 and FIG. 6, the user inputs via GUI a destination location (602). Again, as in FIGS. 7 and 6, the system plots the route (603). However, here a previously calibrated wheel-sensor is used foregoing a need to use GPS to calibrate it (802). Similarly, a previously calibrate magnetic sensor is used again foregoing a need to use GPS (803). As before (FIGS. 7 and 6) the wheel-rotation sensor and magnetic sensor provide speed and direction information, which combined with elapsed time, provides tracking data (606). As in FIG. 7, current location and vehicle direction heading is stored upon power down (701) and used as initial location and vehicle direction heading when powering up and resuming the trip (702).

Vehicular navigation systems tend to be implemented using two system embodiments. In one embodiment, the system is an in-dash system and in the other embodiment, a smartphone with an appropriate application program uses its own GUI, processing and memory to provide routing and tracking services. In the first instance—in-dash embodiment—the wheel-sensor and magnetic sensors could convey their signals conductively if the system is so construed. In the second instance—a smartphone mounted on the dash—there is unlikely to be any provision for conductively conveying signals from wheel-rotation or magnetic sensors. Here, the wheel-rotation data and direction data are conveyed wirelessly.

The two embodiments shown in FIGS. 4 and 5 allow for implementing this navigation system for in-dash or on-dash embodiments.

User input of destination location, or as in FIG. 8 (801) both initial location and destination location may be done using touch-control icons, or voice recognition commands, or combinations of both. System navigation directives may be conveyed graphically on the display, or through voice synthesis commands, or combination of both.

It should be noted that the subsystems described in this application are all prior art. The novelty, it is believed, comes by virtue of how those subsystems are used to obviate the need for GPS signal reception, thus improving the navigation technology.

All drawings and descriptions are meant to be exemplary and should not be read as limiting the scope of the invention.

What is claimed is:

1. A system comprising:
    at least one wheel-rotation sensor operative to detect and convey wheel-rotation data signals;
    a magnetic sensor operative to detect and convey compass direction data signals for a vehicle's direction of travel;
    a satellite positioning receiver subsystem operative to receive a plurality of satellite positioning signals then determine and convey the location coordinates of its position;
    a graphical user interface operative to convey user inputs to an I/O subsystem;
    said graphical user interface operative to receive and display inputs from said I/O subsystem;
    a navigation subsystem comprising:
        a processing unit;
        maps data memory storage; and
        program memory;
    at one least program, executed by said processing unit, operative to direct capturing and storing of a succession of said wheel-rotation data;
    said at least one program operative to direct capturing and storing of a succession of said location coordinates of said satellite positioning receiver subsystem;
    said succession of wheel-rotation data and said succession of said location coordinates are captured concurrently;
    said at least one program operative to direct computing of a first speed based on said succession of said wheel-rotation data;
    said at least one program operative to direct computing of a second speed based on said succession of said location coordinates;
    said at least one program operative to compare said first speed to said second speed;
    said at least one program operative to compute a calibration factor by which said first speed when multiplied by said calibration factor is equal to said second speed;
    said at least one program operative to multiply later captures of said wheel-rotation data by said first calibration factor and to use result to compute vehicle speed;
    said at least one program, executed by said processing unit, operative to direct capturing and storing of a succession of said compass direction data;
    said at least one program operative to direct capturing and storing of a succession of said location coordinates of said satellite positioning receiver subsystem;
    said succession of said compass direction data and said succession of said location coordinates are captured concurrently;
    said at least one program operative to direct computing of a first compass direction based on said succession of said compass direction data;
    said at least one program operative to direct computing of a second compass direction on said succession of said location coordinates;
    said at least one program operative to compare said first compass direction to said second compass direction;
    said at least one program operative to compute a signed calibration offset by which said first compass direction when summed with said calibration offset is equal to said second compass direction; and
    said at least one program operative to add said signed calibration offset to later captures of said compass direction data conveyed by said magnetic sensor subsystem.

2. A method relying on programmatic calibration of sensor data with corresponding satellite position data comprising:
    establishing an initial vehicle location;
    inputting a destination location reference;
    plotting on a display a route linking said initial vehicle location and said destination location;
    capturing, with a processing unit, vehicle speed based on wheel-rotation data;
    capturing, with a processing unit, vehicle direction heading based on magnetic sensor data;
    tracking vehicle position based on said vehicle speed, said vehicle direction and elapsed time;
    plotting on said display said vehicle position using said route as a backdrop;
    establishing an initial vehicle location using received satellite positioning data coordinates;
    calibrating, with a processing unit, a wheel-rotation sensor against speed derived from said received satellite positioning data coordinates;
    calibrating, with a processing unit, a magnetic sensor and correcting said magnetic sensor data against direction derived from said satellite positioning data coordinates,
    storing vehicle location coordinates just prior to power down of vehicle; and
    using stored said vehicle location coordinates as said initial vehicle location just after powering up of vehicle; and
    establishing, in the absence of said satellite positioning data, said initial vehicle position based on user input in view of maps data.

* * * * *